United States Patent
Villar Pique et al.

(10) Patent No.: US 10,003,208 B2
(45) Date of Patent: Jun. 19, 2018

(54) APPARATUS FOR POWER MANAGEMENT

(71) Applicant: NXP B.V., Eindhoven (NL)

(72) Inventors: Gerard Villar Pique, Eindhoven (NL); Hendrik Johannes Bergveld, Eindhoven (NL)

(73) Assignee: NXP B.V., Eindhoven (NL)

( * ) Notice: Subject to any disclaimer, the term of this patent is extended or adjusted under 35 U.S.C. 154(b) by 150 days.

(21) Appl. No.: 15/052,618

(22) Filed: Feb. 24, 2016

(65) Prior Publication Data
US 2017/0244268 A1 Aug. 24, 2017

(51) Int. Cl.
*H02J 7/16* (2006.01)
*H02J 7/04* (2006.01)
*H02J 7/00* (2006.01)
*H02J 7/34* (2006.01)

(52) U.S. Cl.
CPC ............ *H02J 7/0068* (2013.01); *H02J 7/007* (2013.01); *H02J 7/0052* (2013.01); *H02J 7/345* (2013.01); *H02J 2007/0059* (2013.01)

(58) Field of Classification Search
CPC .................................................. H02J 7/0068
USPC ........................................................ 320/162
See application file for complete search history.

(56) References Cited

U.S. PATENT DOCUMENTS

| | | | | |
|---|---|---|---|---|
| 5,606,242 A * | 2/1997 | Hull | ...................... | H02J 7/0004 320/106 |
| 5,650,669 A | 7/1997 | Aldous | | |
| 6,153,949 A * | 11/2000 | Soderhall | .............. | H02J 7/0065 307/125 |
| 7,768,150 B2 | 8/2010 | Platania et al. | | |
| 7,977,911 B2 * | 7/2011 | Maireanu | .............. | H02M 3/156 307/66 |
| 2004/0145348 A1* | 7/2004 | Bucur | ................... | H02J 7/0018 320/128 |
| 2008/0238356 A1* | 10/2008 | Batson | .................. | H02J 7/0045 320/103 |
| 2010/0295379 A1 | 11/2010 | Garcia | | |
| 2010/0308772 A1* | 12/2010 | Walker | .................... | H02M 1/00 320/137 |
| 2012/0262073 A1 | 10/2012 | Sumisaki et al. | | |

FOREIGN PATENT DOCUMENTS

| | | |
|---|---|---|
| CN | 1471214 A | 1/2004 |
| CN | 101431246 A | 5/2009 |

* cited by examiner

*Primary Examiner* — Suresh Memula (57) ABSTRACT

One example discloses, an apparatus for power management, having: a power input node configured to receive charge from a primary power source at a first power level; a power-converter, having an enabled state and a disabled state, and coupled to receive the charge from the power input node; an energy buffer, coupled to receive and store the charge from the power-converter, and configured to release the charge at a second power level; a power output node, coupled to receive the charge from the energy buffer, and configured to supply the charge at the second power level to a load; wherein the second power level is greater than the first power level; and wherein the power-converter switches between the enabled state and the disabled state based on whether the charge is supplied to the load.

19 Claims, 8 Drawing Sheets

APPARATUS FOR POWER MANAGEMENT

The present specification relates to systems, methods, apparatuses, devices, articles of manufacture and instructions for power management.

SUMMARY

According to an example embodiment, an apparatus for power management, comprising: a power input node configured to receive charge from a primary power source at a first power level; a power-converter, having an enabled state and a disabled state, and coupled to receive the charge from the power input node; an energy buffer, coupled to receive and store the charge from the power-converter, and configured to release the charge at a second power level; a power output node, coupled to receive the charge from the energy buffer, and configured to supply the charge at the second power level to a load; the second power level is greater than the first power level; and the power-converter switches between the enabled state and the disabled state based on whether the charge is supplied to the load.

In another example embodiment, the power-converter is in the disabled state when the charge is supplied to the load.

In another example embodiment, the power-converter is configured to switch between the enabled state and the disabled state in response to a signal from at least one of: the load, the energy buffer, a power-controller or the power-converter itself.

In another example embodiment, the power-converter includes a sensor coupled to the power output node and is configured to determine if load is drawing current; and the power-converter is configured to enter the disabled state in response to a signal from the sensor that the load is drawing current.

In another example embodiment, the power-converter is configured to generate a noise signal which is disruptive to the load when the power-converter is in the enabled state.

In another example embodiment, the power-converter is configured to output a power-converter state signal indicating whether the power-converter in the enabled state or the disabled state; the power-converter is configured to input a power-converter control signal configured to command the power-converter to enter either the enabled state or the disabled state; further comprising a power-controller, configured to receive the power-converter state signal and generate the power-converter control signal; the power-controller is configured to receive a load state signal indicating whether the load is in an enabled state or a disabled state; and the power-controller is configured to generate a load control signal configured to command the load to enter either the enabled state or the disabled state.

In another example embodiment, the power-controller is configured to set the power-converter control signal to place the power-converter in the disabled state, if the load state signal indicates the load is in the enabled state.

In another example embodiment, the power-controller is configured to set the load control signal to place the load in the disabled state, if the power-converter state signal indicates the power-converter is in the enabled state.

In another example embodiment, the primary power source is at least one of: a battery, an ambient energy harvesting device, a solar cell, a mains-powered ultra-low-power supply, or any source that can deliver limited output power from a large energy supply.

In another example embodiment, the energy buffer is at least one of: an energy storage element or a supercapacitor.

In another example embodiment, both the power-converter and the energy buffer are directly connected to the power output node.

In another example embodiment, the power-converter is a DC-to-DC power-converter.

In another example embodiment, the power input node is configured to receive a maximum current from the primary power source; the energy buffer is configured to have a maximum output current; and the energy buffer maximum output current is greater than the primary power source maximum current.

In another example embodiment, the power output node is configured to supply an operational current to the load; the power-converter is configured to supply a maximum output current; and the operational current to the load is greater than the maximum output current of the power-converter.

In another example embodiment, the energy buffer is configured to supply a maximum output current; and the operational current to the load is less than the maximum output current of the energy buffer.

According to another example embodiment, an article of manufacture including at least one non-transitory, tangible machine readable storage medium containing executable machine instructions for power management: the article includes: a power input node configured to receive charge from a primary power source at a first power level; a power-converter, having an enabled state and a disabled state, and coupled to receive the charge from the power input node; an energy buffer, coupled to receive and store the charge from the power-converter, and configured to release the charge at a second power level; a power output node, coupled to receive the charge from the energy buffer, and configured to supply the charge at the second power level to a load; the second power level is greater than the first power level; and the instructions include: switching between the enabled state and the disabled state based on whether the charge is supplied to the load.

In another example embodiment, further comprising instructions for: placing the power-converter in the disabled state, if a load state signal which indicates that the load is in an enabled state is received.

In another example embodiment, further comprising instructions for: generating a disable the load signal, if the power-converter is in the enabled state.

This specification is not intended to represent every example embodiment or every implementation within the scope of the current or future Claim sets. The Figures and Detailed Description that follow also exemplify various example embodiments.

Various example embodiments may be more completely understood in consideration of the following Detailed Description in connection with the accompanying Drawings, in which:

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

DETAILED DESCRIPTION

Small batteries (rechargeable and non-rechargeable) used in small portable systems, present two important disadvantages from a power-management perspective: limited energy storage capacity and limited output current capability, which normally translates into a large non-linear output impedance that increases with current. This is especially true for small non-rechargeable batteries, which even have maximum discharge currents below 0.1 C-rate, where a 1 C-rate is the current that discharges the battery in one hour. For applications that require high current peaks due to a highly duty-cycled operation, the limitations in output current displayed by many batteries can become a serious problem. The C in C-rate relates to "capacity". Note that some battery data books refer to capacity as 1 C only, not 1 C-rate.

Figure 1A:
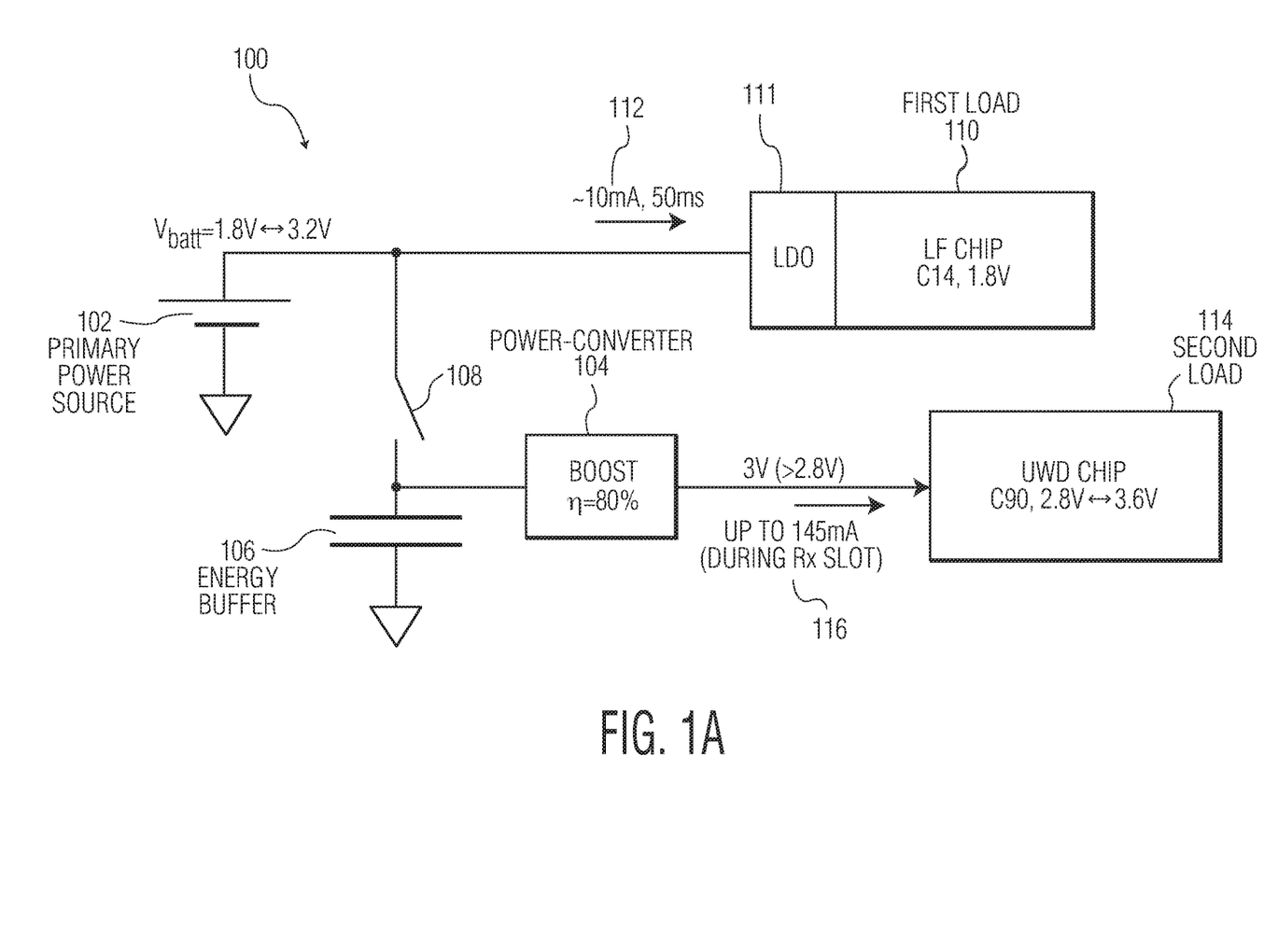
FIG. 1A is a first example of a power management apparatus.
Figure 1B:
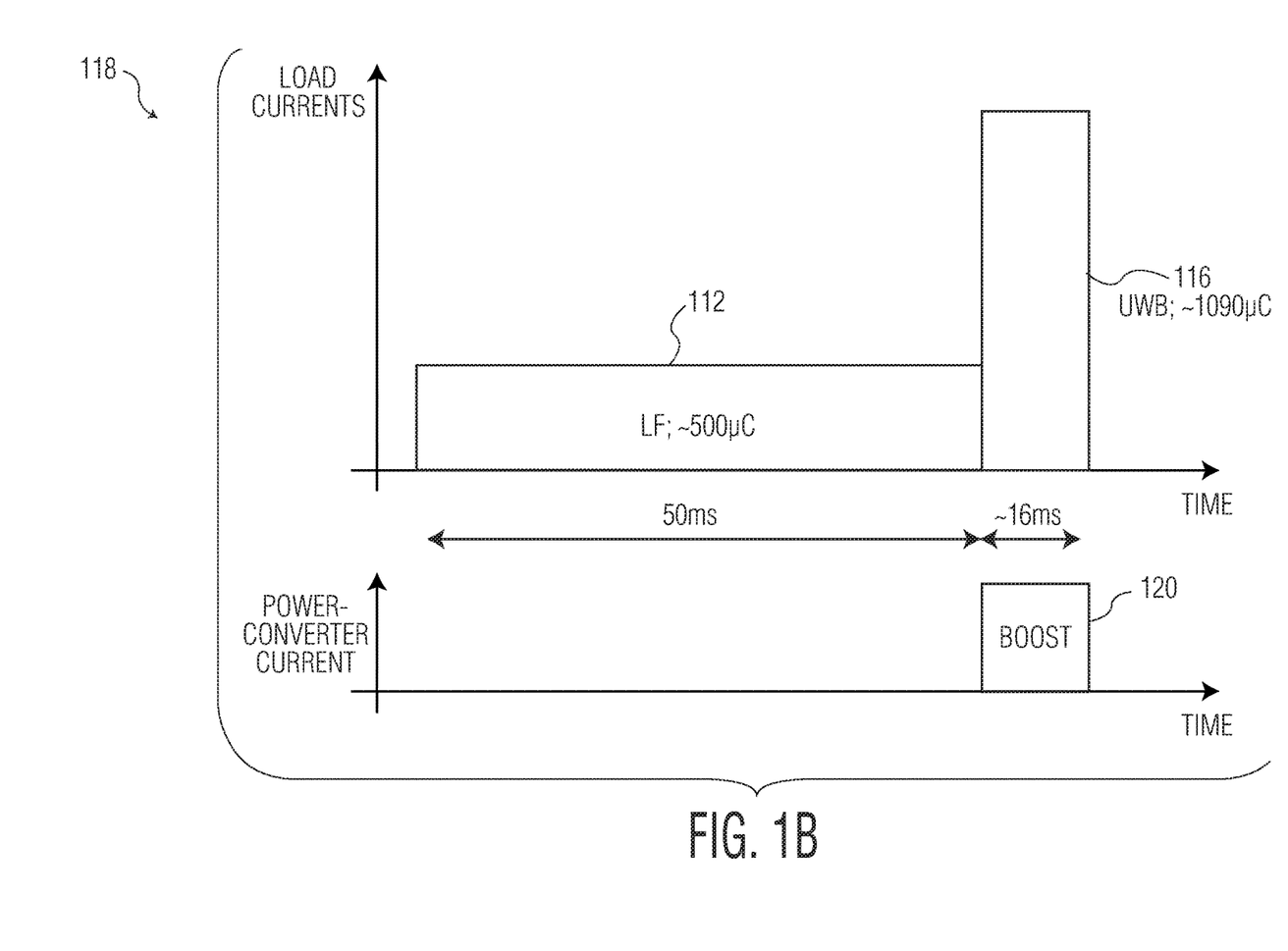
FIG. 1B is an example set of output currents for the first example apparatus.

FIG. 1A is a first example of a power management apparatus 100. FIG. 1B is an example set of output currents 118 for the first example apparatus. The first example apparatus 100 includes: a primary power source 102, a power-converter 104, an energy buffer 106, a switch 108, a first load 110 (e.g. a Low-Frequency (LF) chip) drawing a first load current 112 during operation (e.g. 10 mA), and a second load 114 (e.g. an Ultra-Wide-Band (UWB) chip) drawing a second load current 116 during operation (e.g. in one example embodiment, during a receive (Rx) slot during the time load 114 is on, the load 114 may have current peaks up to 145 mA even though an average load 114 current during said 16 ms may only be 68 mA, yielding the total charge of 1090 uC.).

The energy buffer 106 (e.g. a large decoupling capacitor, a supercapacitor, etc.) aids the battery 102 in supplying high current peaks to the loads 110, 114. For example in FIG. 1A, an energy required to allow the first apparatus 100 to run for a desired overall runtime is stored in the battery 102, whereas the needed power for short times (e.g. small chunks of energy) are stored in the energy buffer 106, which provides a much-lower-impedance path for any needed peak current.

The energy buffer 106 is charged to the primary power source 102 (e.g. battery) voltage by means of a controlled switch 108. The primary power source 102 can for example be a non-rechargeable lithium cell battery, in which case the battery voltage will be lower than 3.2V (nominal voltage 3V). In one example, the switch 108 is activated based on a measured voltage difference between the battery 102 and capacitor 106, triggering a capacitor 106 recharge when the capacitor's 106 voltage becomes too low.

The power-converter 104 (e.g. DC-DC power-converter, buck/boost converter, etc. depending upon the load 114 voltages needed) supplies voltage to second load 114 if the second load 114 requires a different voltage than the battery 102. The LF chip 110 is powered from the battery 102 via a low-dropout voltage regulator (LDO) 111, leading to an LF-chip 110 supply voltage that is lower than the battery 102 voltage. The UWB chip 114 is powered via the DC-DC buck-boost power-converter 104 while it is active, see FIG. 1B. Thus the voltage output of the power-converter 104 will mostly need to be higher than the voltage offered by the battery 102.

As shown in FIG. 1B, the UWB chip 114 consumes considerably more current than the LF chip 110 and in much shorter time. For example, during the UWB chip 114 16 ms on period, short Rx burst of 145 mA are drawn, leading to an overall average current of 68 mA during 16 ms in this case. Since such high current cannot be delivered directly from the non-rechargeable battery 102 (e.g. a typical capacity of a commonly used CR2032 cell is 200-250 mAh, with a maximum discharge current of roughly 15 mA), the energy buffer 106 (e.g. supercapacitor) is needed to deliver the UWB chip's 114 peak power.

Refilling the capacitor 106 from primary power source 102 via a switch can result in a 50% energy loss. Thus, since the DC-DC power-converter 104 is in the higher-current primary-power-source-102-to-load-114 path, the energy efficiency of the supply chain from battery 102 to the load is the product of the efficiency of the recharging process of the capacitor 106 and the power efficiency of the DC-DC power-converter 104.

In case of a switching DC-DC power-converter 104 a concern in noise-sensitive systems (e.g. RF transceivers) is electromagnetic compatibility (EMC) and electromagnetic interference (EMI), due to simultaneous operation of the DC-DC power-converter 104 and any noise-sensitive loads 110, 114. A voltage ripple is present at the output of the DC-DC power-converter 104 while operating at certain switching frequencies, thereby leading to a noise spectrum of a fundamental switching frequency component (i.e. switching frequency) and its harmonics. Though this noise can be lowered, e.g. by choosing a very large output capacitor with very low equivalent series resistance and inductance, such ripple typically remains.

In some cases the switching frequency can be chosen such that its multiples fall outside the band in which the RF transceiver (e.g. the UWB chip 114) is active, but this is not always possible and it restricts the control methods applied in the DC-DC power-converter 104 which in turn prevents from an optimum operation of the DC-DC power-converter 104. If an LDO is used at the DC-DC-power-converter 104 output to filter out the noise, its bandwidth would need to include the switching frequency and its main multiples, which is also not practical in many cases.

Another concern with the power management architecture shown in FIG. 1A, is that the DC-DC boost power-converter 104 needs to be dimensioned to provide power to the load 114 (UWB chip), when the load 114 is active (i.e. at peak load 114 power). In many battery-operated applications, heavy duty cycling is applied to reduce average power consumption, although peak currents (when the system is active) can remain quite high. This increases a peak-to-average ratio of power consumption and requires high output power capability from the DC-DC power-converter 104.

Figure 2A:
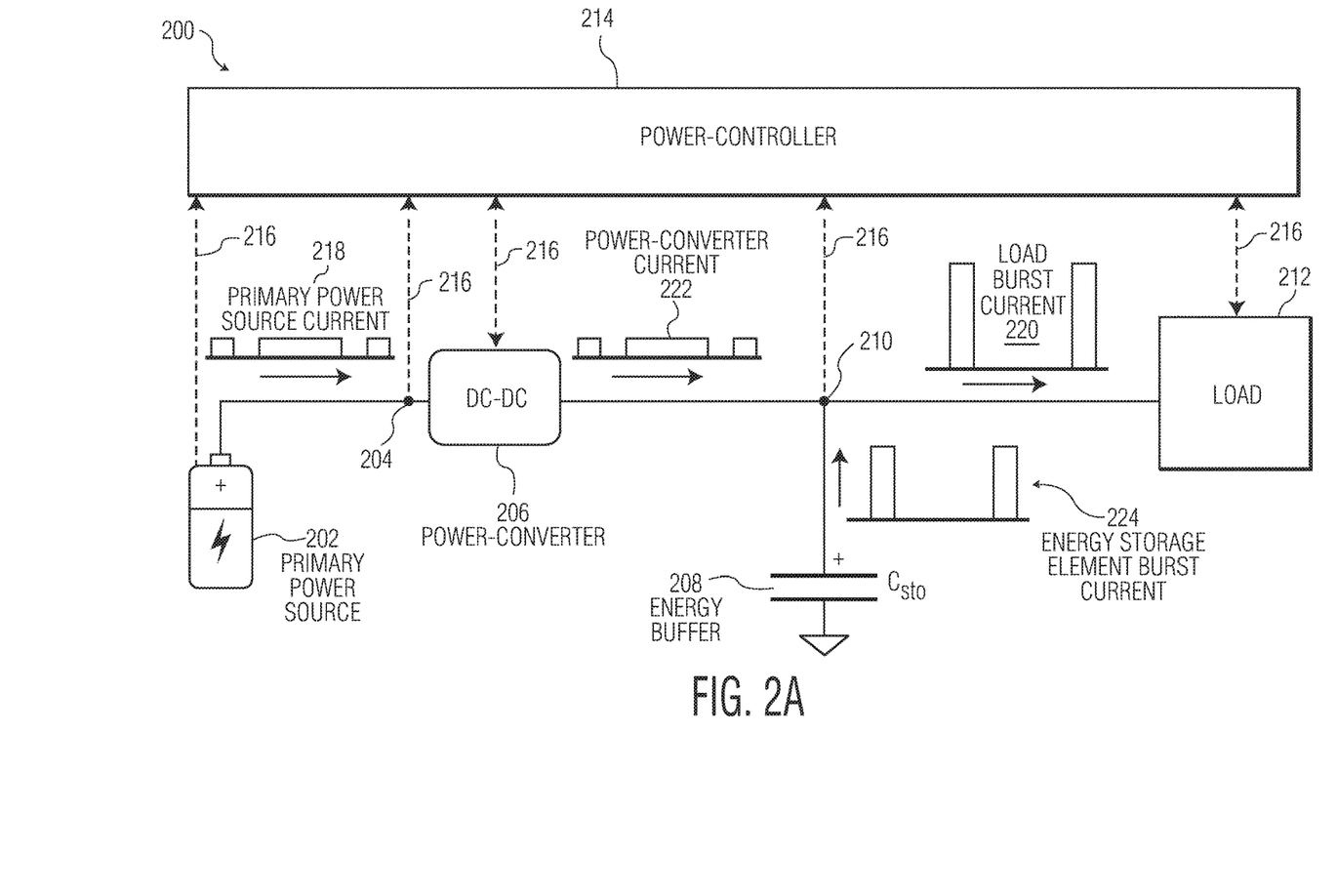
FIGS. 2A and 2B are second and third examples of a power management apparatus according to this invention.
Figure 2B:
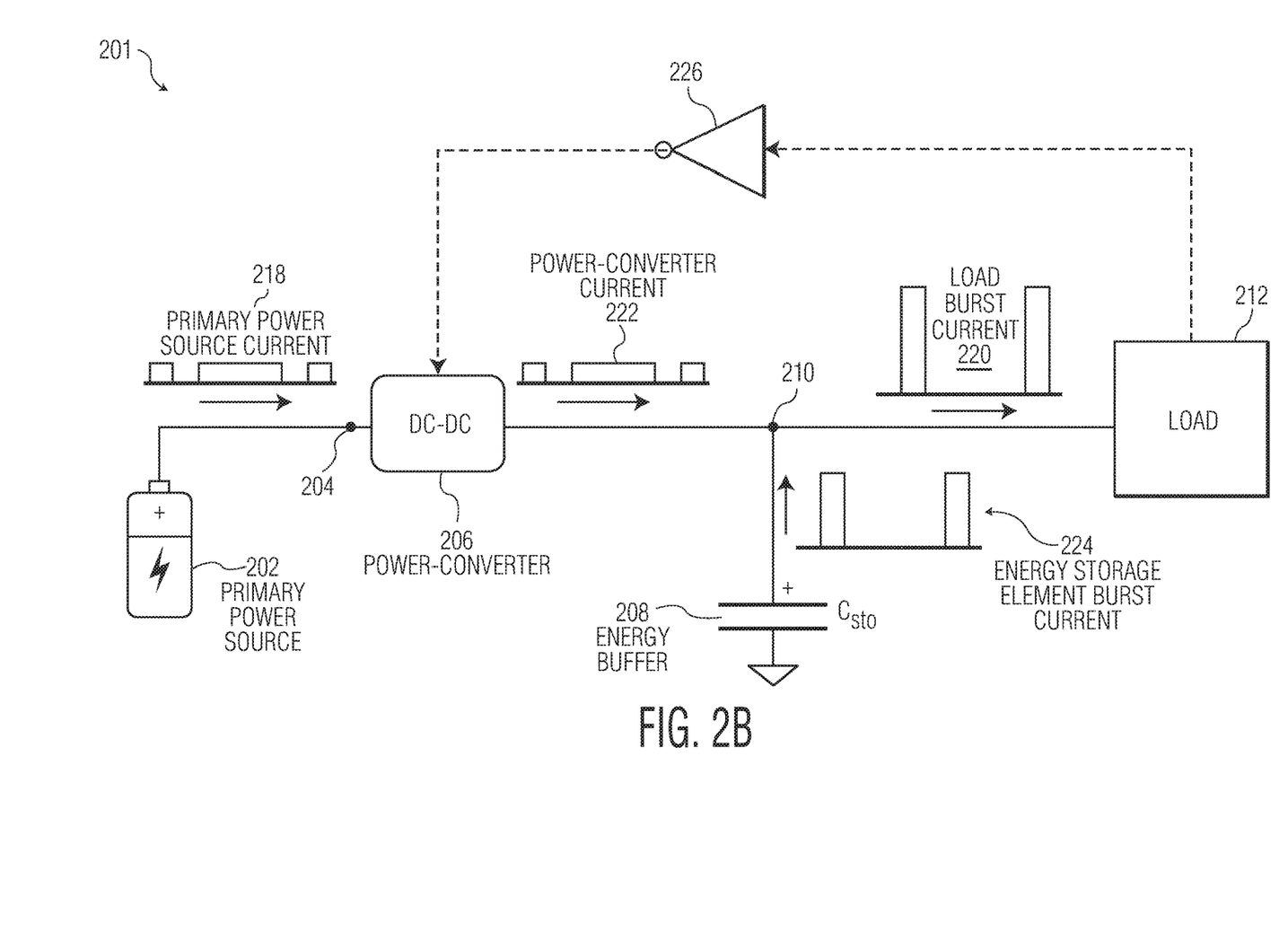

FIGS. 2A and 2B are second 200 and third 201 examples of a power management apparatus according to this invention. In FIG. 2A the second example apparatus 200 includes: a primary power source 202, a power input node 204, a power-converter 206, an energy buffer 208, a power output node 210, a load 212, a power-controller 214, and signal and control lines 216.

The power input node 204 configured to receive charge from the primary power source 202 at a first power level. In various example embodiments, the primary power source 202 is at least one of: a battery, an ambient energy harvesting device, a solar cell, or any source that can deliver limited output power from a large (or endless, e.g. in case the low-power source is connected to the mains) energy supply.

The power-converter 206 has an enabled state and a disabled state, and is coupled to receive the charge from the power input node 204. In one example embodiment, the power-converter 206 is a DC-to-DC power-converter. In some example embodiments, the power-converter 206 may generate noise signals (e.g. EMI) which is disruptive to the load 212 when the power-converter 206 is in the enabled state. As will be discussed further below, such interference can be substantially eliminated by placing the power-converter 206 into the disabled state.

The energy buffer 208 is coupled to receive and store the charge from the power-converter 206, and configured to release the charge at a second power level. In various example embodiments, the energy buffer 208 is at least one of: an energy storage element, a supercapacitor, a secondary battery, etc.

In one example embodiment, both the power-converter 206 and the energy buffer 208 are directly connected to the power output node 210.

The power output node 210 is coupled to receive the charge from the energy buffer 208, and configured to supply the charge at the second power level to a load 212. In one example embodiment, the second power level is greater than the first power level output from the primary power source 202.

The power-converter 206 switches between the enabled state and the disabled state based on whether the charge is supplied to the load 212. In various example embodiments, the power-converter 206 is configured to switch between the enabled state and the disabled state in response to a signal from at least one of: the load 212, the energy buffer 208, the power-controller 214 or the power-converter 206 itself. For example, the power-converter 206 can be set to the disabled state when the charge is supplied to the load 212.

In one example embodiment, the power-converter 206 includes a sensor (not shown) coupled to the power output node 210 and is configured to determine if load 212 is drawing current, and if so then the power-converter 206 is configured to enter the disabled state in response to a signal from the sensor that the load 212 is drawing current.

While the power output node 210 is configured to supply an operational current to the load 212, the primary power source 202 and power-converter 206 may only be configured to supply a maximum output current which is less than the load's 210 operational current. To address this insufficiency, the energy buffer 208 is configured to supply a maximum output current which is greater than the operational current to the load 212.

In another embodiment, when the energy buffer's 208 voltage drops below a threshold value based on the load's 212 power requirements, the power-controller 214 suspends operation of the load 212 and enables the power-converter 206 (e.g. DC/DC) to recharge the energy buffer 208. The power-controller 214 in one example sets the threshold value based on an energy required to allow a burst operation of the load 212.

In FIG. 2A, example currents to and from the various devices 202, 206, 208 and 212 are shown as follows: a primary power source current 218, a load burst current 220, a power-converter current 222, and an energy storage element burst current 224. Note that in these example currents the power-converter 206 is not continuously enabled. In one example embodiment, the power converter 206 is disabled when energy buffer 208 delivers burst currents to the load 212, resulting in the discontinuous power converter current 222 and primary power source current 218 as shown in FIG. 2A. Later in FIG. 3B, a similar example set of output currents is shown in more detail, wherein the power-converter 206 is also alternately enabled and disabled.

The power-controller 214 is configured to interface with the primary power source 202, the power input node 204, the power-converter 206, the energy buffer 208, the power output node 210, and the load 212 using the signal and control lines 216.

In various example embodiments, the signal and control lines 216 enable the power-controller 214 to monitor voltages, currents, energy buffer 208 charge levels, and state signals (e.g. enabled, disabled, active, stand-by, etc.) and/or transmit control signals (e.g. enable, disable, set device mode, interrupt device operation, etc.) to the primary power source 202, the power-converter 206, the energy buffer 208, and the load 212. Note, signal lines 216 monitor both the primary power source 202 (e.g. to gracefully shut down the system when the battery reaches its fully depleted state) and the power input node 204 (e.g. to limit current draw to a maximum that the primary source can supply).

For example, the power-converter 206 can be configured to output, to the power-controller 214, a power-converter state signal indicating whether the power-converter 206 in the enabled state or the disabled state. The power-converter 206 could also be configured to input, from the power-controller 214, a power-converter control signal which commands the power-converter 206 to enter either the enabled state or the disabled state.

The power-controller 214 could also be configured to receive a load state signal indicating whether the load 212 is in an enabled state or a disabled state, and to generate a load control signal configured to command the load 212 to enter either the enabled state or the disabled state.

With such monitoring and control, the power-controller 214 can then place the power-converter 206 in the disabled state, if the load state signal indicates the load 212 is in the enabled state. Alternately, the power-controller 214 could place the load 212 in the disabled state, if the power-converter 206 state signal indicates the power-converter 206 is in the enabled state. Using such a discontinuous operation both the primary power source 202 and the power-converter 206 can be designed and sized for average power consumption instead of peak power consumption.

FIG. 2B is a third 201 example of a power management apparatus according to this invention. In FIG. 2B, the power-controller 214 is replaced with an inverter 226. In this example embodiment, the power-converter 206 is directly enabled and disabled by a signal from the load 212.

The second and third example apparatus 200, 201 are advantageous over the first example apparatus 100 in at least four ways.

First, the energy loss in the power path between the primary power source 202 and the load 212 is reduced. This allows use of batteries with lower energy storage for a same operation profile of the application. Power losses are further reduced since the energy buffer 208 (e.g. supercapacitor) is charged by means of a more efficient power-converter 206 than permitted by the first example apparatus' 100 design which includes a switch 108. Additionally, the energy buffer 208 is charged to a voltage which matches the supply voltage of the load 212, which is not the case in FIG. 1 where the supercapacitor is charged to the primary power source 202 voltage. Thus, a voltage conversion step is saved, thereby further reducing loss of energy.

Second, electromagnetic compatibility (EMC) between the power-converter 206 and its potentially noise-sensitive load 212 is improved due to the power-converter's 206 enable/disable feature. The second example apparatus 200 shows an architecture where the power-converter 206 is used to charge the energy buffer 208 (e.g. supercapacitor) at the voltage level required by the load 212 during the stand-by periods of the system, which are much larger than the active periods in many heavily duty-cycled applications.

Thus in one example, to avoid electromagnetic interference between the switching power-converter 206 and the noise-sensitive load 212, the power-converter 206 only operates during the inactive periods from the load 212. When the load 212 is active, the power-converter 206 remains inactive so that it does not generate any interference. This relaxes the requirements of the control method used to control the operation of the power-converter 206 (e.g. any demands for a certain switching frequency to keep the fundamental and its harmonics outside the band of interest of the transceiver), which allows the use of more energy-efficient methods (e.g. pulse-frequency modulation, where the switching frequency varies over a relatively large band leading to a much higher efficiency at low output power), and even with lower quiescent power.

Third, the power supplied by the primary power source 202 is reduced, thereby allowing the primary power source 202 to have a higher output impedance, and thus be physically smaller as well. This reduction is possible in part since the stand-by periods of the load 212 are, in some example embodiments, much longer than its active periods (i.e. heavy duty-cycled operation), thus the ratio of the power supplied by the power-converter 206 and the power required by the load 212 is reduced by a factor D/(1-D), where D denotes the duty cycle of the activity of the system. Since the power supplied by the primary power source 202 is proportional to the power supplied by the power-converter 206, the current that needs to be supplied by the primary power source 202 is also reduced by a factor D/(1-D), as compared with the first example apparatus 100 in FIG. 1A.

Fourth, the power-converter's 206 physical size can be reduced since its output power requirements are reduced. In one example, where a relatively high power is drawn by the load 212 for a limited time, a system efficiency of the second example apparatus 200 is increased by separating the load's 212 demand for peak power (e.g. short power bursts) from the load's 212 demand for average power (e.g. relative slow charge transfer from primary power source 202 to the energy buffer 208).

Thus by moving the power-converter 206 to the average-power path (i.e. where the energy buffer 208 can supply power directly to the load 212 as shown in FIG. 2), instead of in the way of the peak-power path (i.e. where the power-converter 206 is between the energy buffer 208 and the load 212 as shown in FIG. 1A), the power-converter 206 can be designed for a lower average load 212 power. An additional advantage of reducing the power rating of the power-converter 206 is that its implementation requires smaller and cheaper components, reducing both the cost and the physical volume of the power-converter 206.

Variations of the second example apparatus 200 can be applied to any system where the instantaneous demands of current from a load cannot be directly supplied by a primary power source, such as a battery. Using the second example apparatus 200, a device could be equipped with a smaller primary power source for a same operational lifetime, while any necessary power-converter can be realized in a less expensive way (e.g. dimensioned for lower power) and its EMC problem is mitigated as well.

With this power management architecture in a battery-operated system: electromagnetic interference (EMI) decreases, electromagnetic compatibility (EMC) increases, energy efficiency increases, maximum primary power source input current is reduced; and power-converter 206 specifications can be relaxed.

Figure 3A:
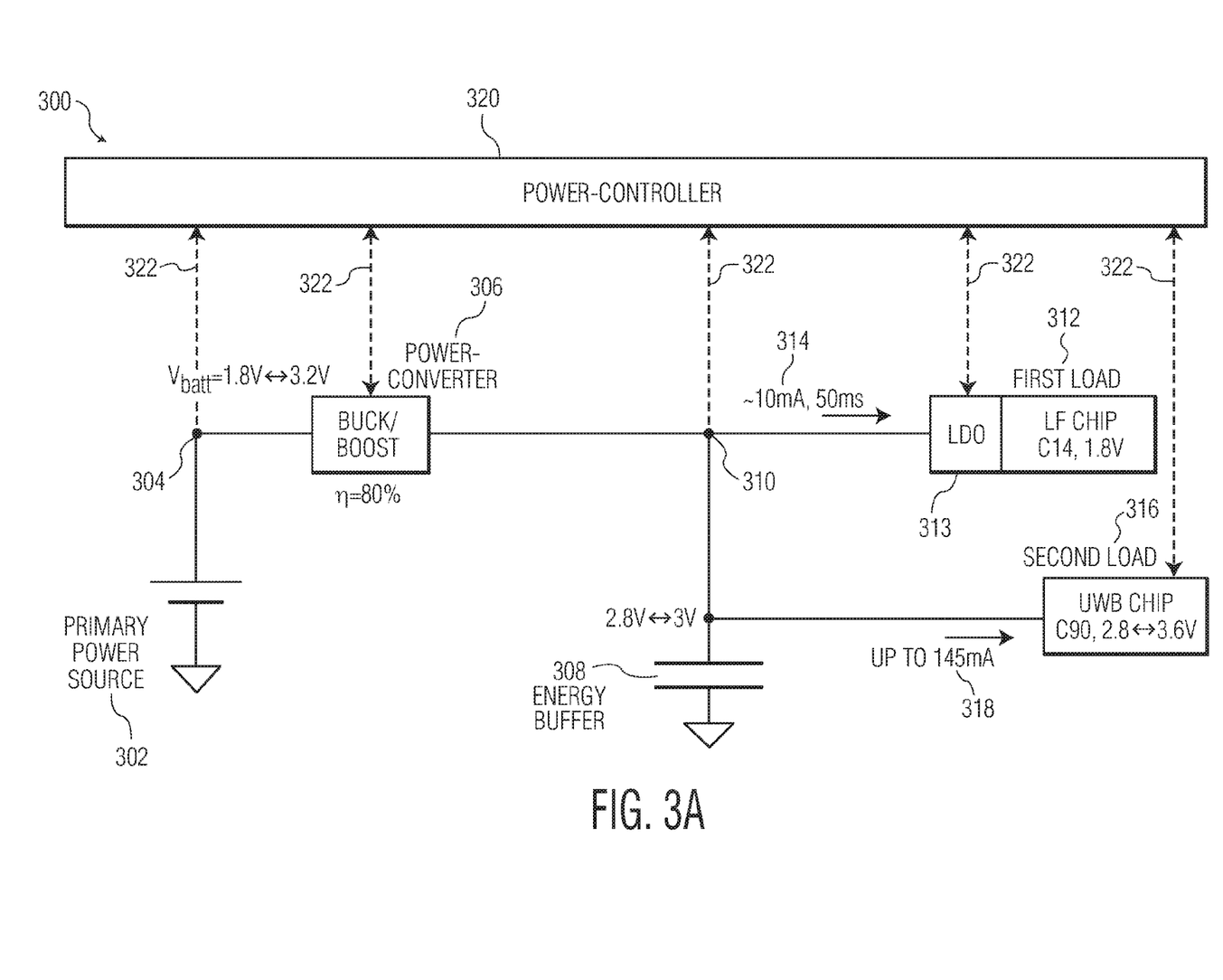
FIG. 3A is a fourth example of a power management apparatus according to this invention.

FIG. 3A is a fourth example of a power management apparatus 300. The fourth example apparatus 300 includes: a primary power source 302, a power input node 304, a power-converter 306, an energy buffer 308, a power output node 310, a first load 312, a second load 316, a power-controller 320, and a set of signal and control lines 322.

The first load 312 is powered by a low-dropout voltage regulator (LDO) 313 and draws a first load current 314. The second load 316 draws a second load current 318.

Figure 3B:
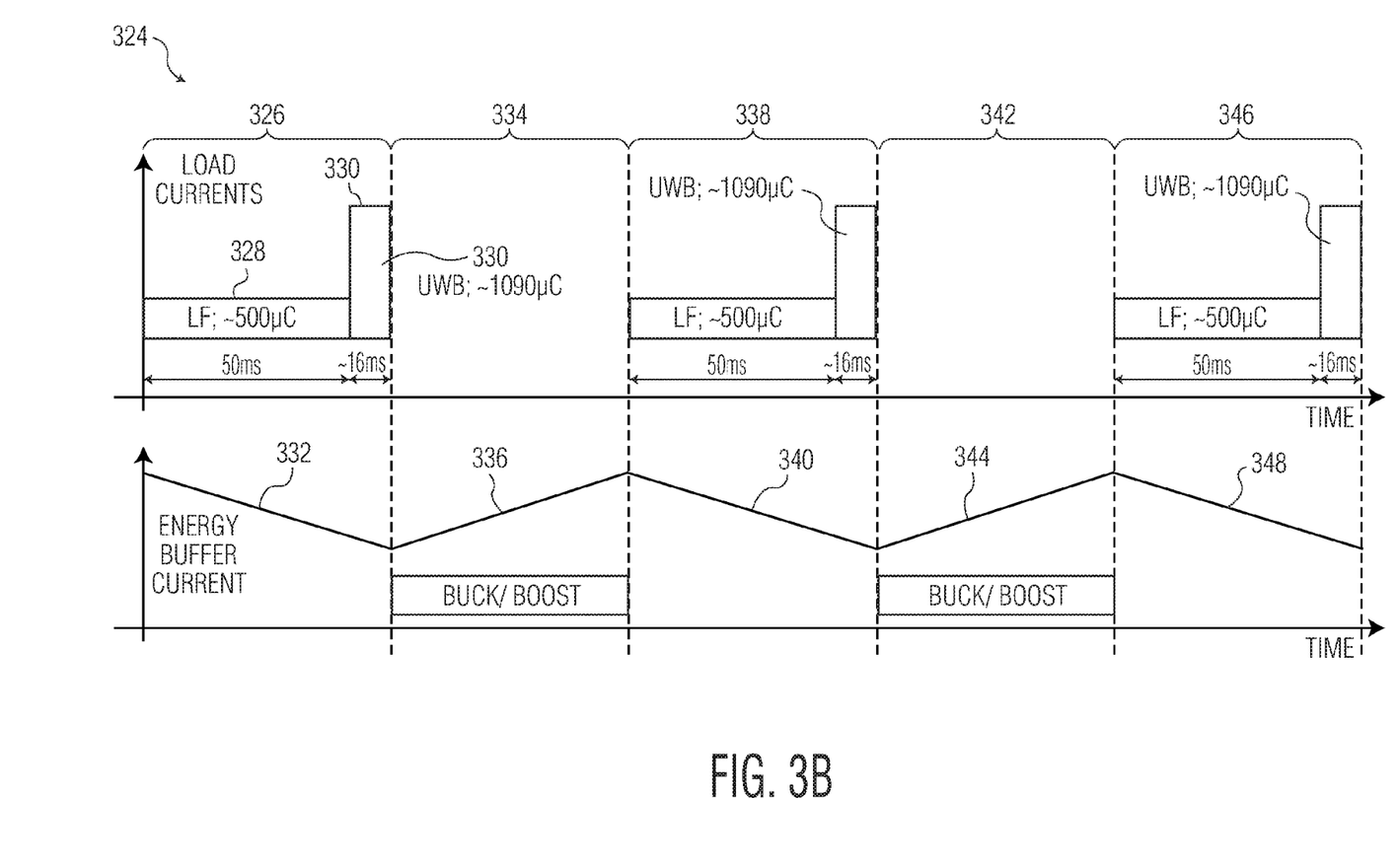
FIG. 3B is an example set of output currents for the fourth example apparatus.

While the fourth example apparatus 300 operates in a manner similar to that of the second example apparatus 200, FIG. 3B displays an example set of output currents 324 for the fourth example apparatus 300 during one example set of operational conditions.

The example set of output currents 324 in FIG. 3B are partitioned into a set of time periods 326, 334, 338, 342 and 346.

In the first time period 326 the loads 312, 316 are enabled by the power-controller 320 and the power-converter 306 is disabled by the power-controller 320. The first load 312 draws a first load current 328 for 50 ms and the second load 316 draws a second load current 330 for 16 ms. During this first time period 326 the energy buffer 308 supplies both currents 328, 330 and thus experiences an energy buffer current discharge 332.

In the second time period 334 the loads 312, 316 are disabled by the power-controller 320 and the power-converter 306 is enabled (e.g. labeled as "Buck/Boost") by the power-controller 320. This permits the energy buffer 308 to experience an energy buffer current recharge 336.

This operational process repeats as shown by the third, fourth and fifth time periods 338, 342, 346. In this sequence, the energy buffer 308 experiences an energy buffer current discharge 340, an energy buffer current recharge 344, and then an energy buffer current discharge 348. As shown in FIG. 3B, the loads 312, 316 and the power-converter 306 do not operate at the same time (or have minimal overlap) so as to maximize electromagnetic compatibility and reduce electromagnetic interference.

Figure 4:
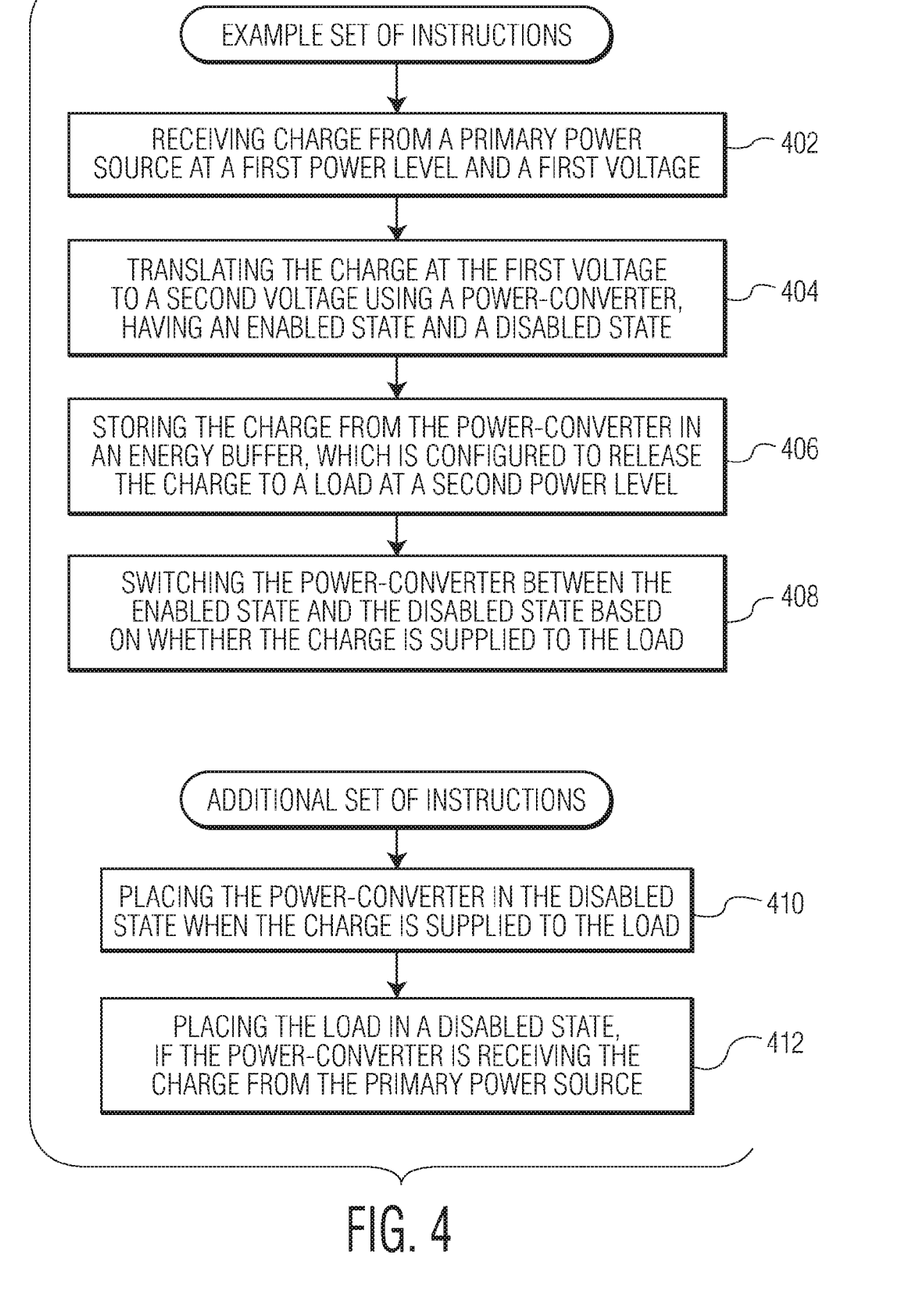
FIG. 4 is an example set of instructions for enabling a power management apparatus according to this invention.

FIG. 4 is an example set 400 of instructions for enabling a power management apparatus. The order in which the instructions are discussed does not limit the order in which other example embodiments implement the instructions unless otherwise specifically stated. Additionally, in some embodiments the instructions are implemented concurrently.

A first example instruction set begins in 402, by receiving charge from a primary power source at a first power level and a first voltage. Then in 404, translating the charge at the first voltage to a second voltage using a power-converter, having an enabled state and a disabled state. In 406, storing the charge from the power-converter in an energy buffer, which is configured to release the charge to a load at a second power level. Then in 408, switching the power-converter between the enabled state and the disabled state based on whether the charge is supplied to the load.

The instructions can be augmented or replaced with one or more of the following additional instructions, presented in no particular order: 410—placing the power-converter in the disabled state when the charge is supplied to the load; and 412—placing the load in a disabled state, if the power-converter is receiving the charge from the primary power source.

Figure 5:
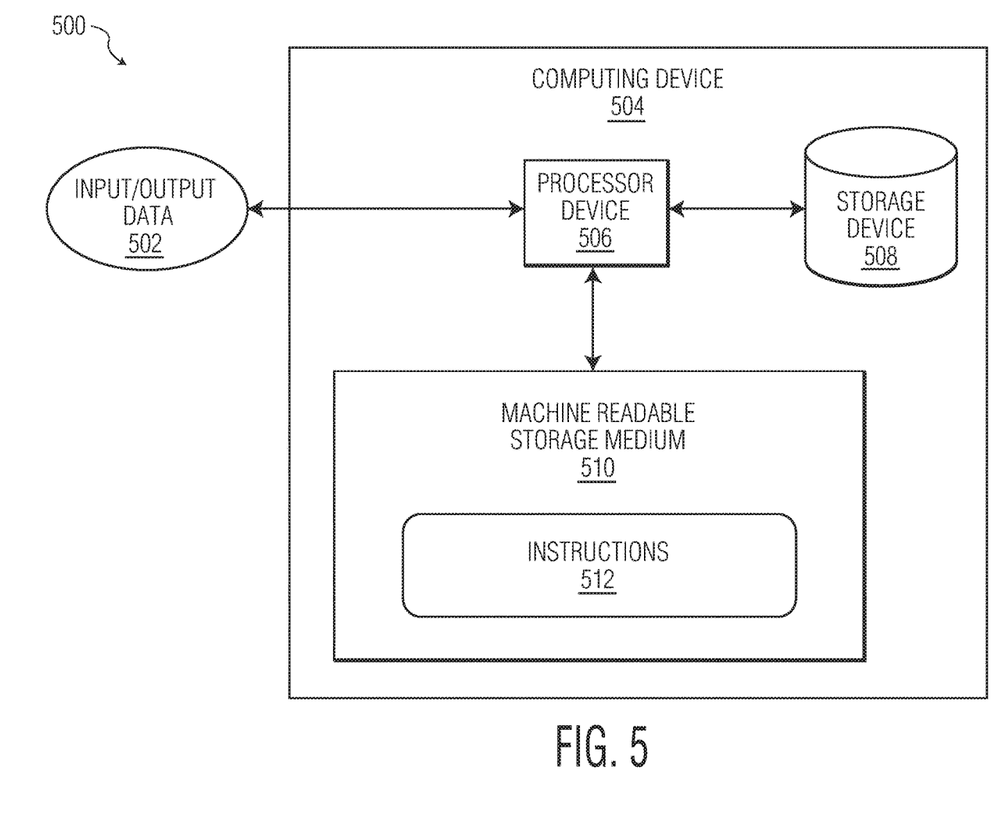
FIG. 5 is an example system for hosting instructions for enabling power management apparatus according to this invention.

FIG. 5 is an example system 500 for hosting instructions for enabling power management apparatus. The system 500 shows an input/output data 502 interface with an electronic apparatus 504. The electronic apparatus 504 includes a processor 506, a storage device 508, and a non-transient machine-readable storage medium 510. The machine-readable storage medium 510 includes instructions 512 which control how the processor 506 receives input data 502 and transforms the input data into output data 502, using data within the storage device 508. Example instructions 512 stored in the machine-readable storage medium 510 are discussed elsewhere in this specification. The machine-readable storage medium in an alternate example embodiment is a non-transient computer-readable storage medium. In an alternate embodiment, the power-controller can be embodied in a dedicated hardware design, such as an ASIC with memory.

The processor (such as a central processing unit, CPU, microprocessor, application-specific integrated circuit (ASIC), etc.) controls the overall operation of the storage device (such as random access memory (RAM) for temporary data storage, read only memory (ROM) for permanent data storage, firmware, flash memory, external and internal hard-disk drives, and the like). The processor device communicates with the storage device and non-transient machine-readable storage medium using a bus and performs operations and tasks that implement one or more instructions stored in the machine-readable storage medium. The machine-readable storage medium in an alternate example embodiment is a computer-readable storage medium.

In this specification, example embodiments have been presented in terms of a selected set of details. However, a person of ordinary skill in the art would understand that many other example embodiments may be practiced which include a different selected set of these details. It is intended that the following claims cover all possible example embodiments.

What is claimed is:

1. An apparatus for power management, comprising:
a power input node configured to receive charge from a primary power source at a first power level;
a power-converter, having an enabled state and a disabled state, and coupled to receive the charge from the power input node;
an energy buffer, coupled to receive and store the charge from the power-converter, and configured to release the charge at a second power level;
a power output node, coupled to receive the charge from the energy buffer, and configured to supply the charge at the second power level to a load;
wherein the second power level is greater than the first power level; and
wherein the power-converter switches between the enabled state and the disabled state based on whether the charge is supplied to the load.

2. The apparatus of claim 1:
wherein the power-converter is in the disabled state when the charge is supplied to the load.

3. The apparatus of claim 1:
wherein the power-converter is configured to switch between the enabled state and the disabled state in response to a signal from at least one of: the load, the energy buffer, a power-controller or the power-converter itself.

4. The apparatus of claim 1:
wherein the power-converter includes a sensor coupled to the power output node and is configured to determine if load is drawing current; and
wherein the power-converter is configured to enter the disabled state in response to a signal from the sensor that the load is drawing current.

5. The apparatus of claim 1:
wherein the power-converter is configured to generate a noise signal which is disruptive to the load when the power-converter is in the enabled state.

6. The apparatus of claim 1:
wherein the power-converter is configured to output a power-converter state signal indicating whether the power-converter in the enabled state or the disabled state;
wherein the power-converter is configured to input a power-converter control signal configured to command the power-converter to enter either the enabled state or the disabled state;
further comprising a power-controller, configured to receive the power-converter state signal and generate the power-converter control signal;
wherein the power-controller is configured to receive a load state signal indicating whether the load is in an enabled state or a disabled state; and
wherein the power-controller is configured to generate a load control signal configured to command the load to enter either the enabled state or the disabled state.

7. The apparatus of claim 6:
wherein the power-controller is configured to set the power-converter control signal to place the power-converter in the disabled state, if the load state signal indicates the load is in the enabled state.

8. The apparatus of claim 6:
wherein the power-controller is configured to set the load control signal to place the load in the disabled state, if the power-converter state signal indicates the power-converter is in the enabled state.

9. The apparatus of claim 1:
wherein the primary power source is at least one of: a battery, an ambient energy harvesting device, a solar cell, a mains-powered ultra-low-power supply, or any source that can deliver limited output power from an energy supply.

10. The apparatus of claim 1:
wherein the energy buffer is at least one of: an energy storage element or a supercapacitor.

11. The apparatus of claim 1:
wherein both the power-converter and the energy buffer are directly connected to the power output node.

12. The apparatus of claim 1:
wherein the power-converter is a DC-to-DC power-converter.

13. The apparatus of claim 1:
wherein the power input node is configured to receive a maximum current from the primary power source;
wherein the energy buffer is configured to have a maximum output current; and
wherein the energy buffer maximum output current is greater than the primary power source maximum current.

14. The apparatus of claim 1:
wherein the power output node is configured to supply an operational current to the load;
wherein the power-converter is configured to supply a maximum output current; and
wherein the operational current to the load is greater than the maximum output current of the power-converter.

15. The apparatus of claim 14:
wherein the energy buffer is configured to supply a maximum output current; and
wherein the operational current to the load is less than the maximum output current of the energy buffer.

16. An article of manufacture including at least one non-transitory, tangible machine readable storage medium containing executable machine instructions for power management, comprising:
wherein the article includes:
a power input node configured to receive charge from a primary power source at a first power level;
a power-converter, having an enabled state and a disabled state, and coupled to receive the charge from the power input node;
an energy buffer, coupled to receive and store the charge from the power-converter, and configured to release the charge at a second power level;
a power output node, coupled to receive the charge from the energy buffer, and configured to supply the charge at the second power level to a load;
wherein the second power level is greater than the first power level; and
wherein the instructions include:
switching between the enabled state and the disabled state based on whether the charge is supplied to the load.

17. The article of claim 16, further comprising instructions for:
placing the power-converter in the disabled state, if a load state signal which indicates that the load is in an enabled state is received.

18. The article of claim 16, further comprising instructions for:
generating a disable the load signal, if the power-converter is in the enabled state.

19. The apparatus of claim 1:
wherein both the power-converter and the energy buffer are configured to simultaneously supply the charge to the load.

* * * * *